US007710232B1

(12) United States Patent
Stalford et al.

(10) Patent No.: US 7,710,232 B1
(45) Date of Patent: May 4, 2010

(54) MICROELECTROMECHANICAL TUNABLE INDUCTOR

(75) Inventors: Harold L. Stalford, Norman, OK (US); Vincent M. Hietala, Albuquerque, NM (US); James G. Fleming, Albuquerque, NM (US); Carol Fleming, legal representative, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 439 days.

(21) Appl. No.: 11/746,147

(22) Filed: May 9, 2007

(51) Int. Cl.
*H01F 27/29* (2006.01)
*H01F 21/04* (2006.01)
*H01F 5/00* (2006.01)
*H01H 57/00* (2006.01)
*H02N 1/00* (2006.01)
*H01G 5/00* (2006.01)

(52) U.S. Cl. ........................ 336/192; 336/116; 336/200; 200/181; 310/309; 361/277

(58) Field of Classification Search ................. 336/116, 336/192, 200; 200/181; 310/309; 361/277
See application file for complete search history.

(56) References Cited

U.S. PATENT DOCUMENTS

| | | | | |
|---|---|---|---|---|
| 2,308,863 | A * | 1/1943 | Craymer | 336/116 |
| 3,897,997 | A * | 8/1975 | Kalt | 359/230 |
| 3,989,357 | A | 11/1976 | Kalt | |
| 4,235,522 | A * | 11/1980 | Simpson et al. | 359/230 |
| 4,266,339 | A | 5/1981 | Kalt | |
| 4,704,707 | A * | 11/1987 | Simpson | 365/244 |
| 6,067,183 | A * | 5/2000 | Furlani et al. | 359/254 |
| 6,101,371 | A * | 8/2000 | Barber et al. | 455/73 |
| 6,184,755 | B1 | 2/2001 | Barber et al. | |
| 6,456,183 | B1 * | 9/2002 | Basteres et al. | 336/200 |
| 6,456,190 | B1 * | 9/2002 | Andersson et al. | 337/365 |
| 6,621,141 | B1 | 9/2003 | Van Schuylenbergh et al. | |
| 6,879,084 | B2 * | 4/2005 | Pizzi | 310/309 |
| 6,922,127 | B2 | 7/2005 | Zou et al. | |
| 2005/0270135 | A1 * | 12/2005 | Chua et al. | 336/192 |
| 2006/0055287 | A1 * | 3/2006 | Kawakubo et al. | 310/348 |

OTHER PUBLICATIONS

Victor M. Lubecke et al, "Self-Assembling MEMS Variable and Fixed RF Inductors", IEEE Transactions on Microwave Theory and Techniques, vol. 49, No. 11, Nov. 2001, pp. 2093-2098.

Christopher L. Chua et al, "Our-of-Plane High-Q Inductors on Low-Resistance Silicon", Journal of Microelectromechanical Systems, vol. 12, No. 6, 2003, pp. 989-995.

Imed Zine-El-Abidine et al, "Tunable radio frequency MEMS inductors with thermal bimorph actuators," Journal of Micromechanics and Microengineering, vol. 15, , 2005, pp. 2063-2068.

(Continued)

*Primary Examiner*—Lincoln Donovan
*Assistant Examiner*—Tszfung Chan
(74) *Attorney, Agent, or Firm*—John P. Hohimer

(57) ABSTRACT

A microelectromechanical tunable inductor is formed from a pair of substantially-identically-sized coils arranged side by side and coiled up about a central axis which is parallel to a supporting substrate. An in-plane stress gradient is responsible for coiling up the coils which. The inductance provided by the tunable inductor can be electrostatically changed either continuously or in discrete steps using electrodes on the substrate and on each coil. The tunable inductor can be formed with processes which are compatible with conventional IC fabrication so that, in some cases, the tunable inductor can be formed on a semiconductor substrate alongside or on top of an IC.

24 Claims, 9 Drawing Sheets

OTHER PUBLICATIONS

Stella Chang et al, "A Tunable RF MEMS Inductor on silicon Incorporating an Amorphous Silicon Bimorph in a Low-Temperature Process," IEEE Electron Device Letters, vol. 27, No. 11, Nov. 2006, pp. 905-907.

* cited by examiner

MICROELECTROMECHANICAL TUNABLE INDUCTOR

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical devices, and in particular to a tunable inductor which can be electrostatically tuned to change its inductance.

BACKGROUND OF THE INVENTION

In the radio frequency (RF) and microwave technology domain there is a need to integrate passive components including inductors, capacitors, switches and filters on an integrated circuit (IC) chip to lower device size and manufacturing cost and to improve performance and reliability. The integration of these passive devices into an RF IC will provide high value for such applications as voltage-controlled-oscillator (VCO), phase-locked-loop (PLL) and other RF functionality required for advanced telecom systems.

Efforts have been focused on improving the RF performance of silicon IC technology, in part due to its low cost, dielectric compatibility, and micromachining properties. The on-chip integration of relatively high-Q fixed and variable inductors with silicon IC technology, however, has been problematic due to the parasitic effects of low-conductivity metallization as well as lossy substrate interactions. As a result, the quality factor Q of inductors fabricated using silicon IC technology is less than about 10 at a frequency of 2 GHz. Therefore, to achieve high performance, most RF IC applications still require the use of off-chip inductors. However, drawbacks of the off-chip inductors include significant parasitic effects, prohibitive size, and large losses due to board-level flip-chip and/or surface-mount interconnections.

Inductors with disk-shaped coils wound about an axis which is substantially perpendicular to an underlying semiconductor substrate are lossy due to eddy currents induced in the closely underlying substrate, and also due skin effects which restrict an alternating current (AC) in the coil to a small skin depth at the edge of the coil thereby substantially increasing the AC resistance of the coil. Efforts to overcome the drawbacks of disk-shaped coil inductors with the above-cited alignment have sought to raise the inductors off the substrate (see e.g. U.S. Pat. Nos. 6,184,755; 6,621,141; and 6,922,127).

The present invention provides an advance over the prior art by providing a tunable inductor having a pair of coils of substantially the same size which are arranged about a central axis which is substantially parallel to the substrate, and with the pair of coils being electrostatically unrolled in tandem to change the inductance.

The tunable inductor of the present invention comprises multi-turn coils which can be partially or completely unrolled to provide a wide variation in inductance.

The electrical power required to tune the inductor of the present invention is low since tuning is accomplished electrostatically, and not by resistive current heating.

The tunable inductor of the present invention can also be digitally tuned by shaping the coils and/or underlying electrodes, or alternately by using a segmented electrode beneath the pair of coils.

These and other advantages of the present invention will become evident to those skilled in the art.

SUMMARY OF THE INVENTION

The present invention relates to a tunable inductor which comprises a pair of coils of substantially the same size arranged side by side and coiled about a central axis which is oriented substantially parallel to a supporting substrate. Each coil comprises a plurality of turns and has a first end anchored to the supporting substrate, and a second end where the pair of coils are connected together by a bridge which is suspended above the substrate. A first electrode extends beneath each coil, and can be formed on the substrate, or from the substrate. A second electrode is located on each coil and forms at least a part of the bridge connecting the pair of coils together. The inductance of the tunable inductor can be changed by applying a voltage between the first and second electrodes. This partially or completely uncoils (i.e. unrolls) the pair of coils with the exact extent of uncoiling depending upon an applied voltage.

The coiling in the tunable inductor is due to a layer of a compressively-stressed material (e.g. silicon dioxide) and a layer of a tensile-stressed material (e.g. silicon nitride) which are laminated together to form the coils. In some embodiments of the present invention, each coil in the tunable inductor can have a shape which is tapered or stepped with distance from the first end to the second end. This is useful for forming the coils without tangling, and also to provide an inductance L which varies proportionately to an applied voltage V. In other embodiments of the present invention, the tunable inductor can have coils with a lattice structure, or with a density of etch-release holes that varies with distance from the first end to the second end.

The supporting substrate can comprise a semiconductor substrate (e.g. silicon or a silicon IC). The first electrode can be uniform in width, or tapered or stepped. In some embodiments of the present invention, the first electrode can have a zigzag shape. In other embodiments of the present invention, the first electrode can comprise a segmented electrode. The second electrode can comprise a metal selected from the group consisting of aluminum, copper and tungsten.

The present invention also relates to a tunable inductor which comprises a substrate, and a pair of elongate members formed side by side on the substrate and connected together at one end thereof and having an in-plane stress gradient which urges the connected end of the pair of elongate members to coil away from the substrate and to form a pair of substantially identically-sized multi-turn coils from the pair of elongate members, with each multi-turn coil being formed about a central axis which is substantially parallel to the substrate. The tunable inductor also comprises a first electrode which extends beneath the pair of elongate members, and a second electrode which is formed on the pair of elongate members. A voltage applied between the first and second electrodes can be used to partially or completely uncoil the pair of substantially identically-sized multi-turn coils, thereby changing the inductance of the tunable inductor.

The substrate can comprise a semiconductor substrate (e.g. silicon). Each elongate member can comprise a compressively-stressed layer (e.g. silicon dioxide), and a tensile-stressed layer (e.g. silicon nitride, or tungsten, or both). Each elongate member can also have a tapered or stepped shape, or alternately can have a plurality of etch-release holes therein which vary in density with distance towards the unanchored end of that elongate member.

The first electrode can comprise polycrystalline silicon or metal (e.g. aluminum, copper or tungsten), or can even be formed from the substrate. In some embodiments of the present invention, the first electrode can have a tapered, stepped or zigzag shape. In other embodiments of the present invention, the first electrode can comprise a segmented electrode which further comprises a plurality of electrodes which are addressable independently or in sets to digitally vary the inductance of the tunable inductor. The second electrode generally comprises metal (e.g. aluminum, copper or tungsten).

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
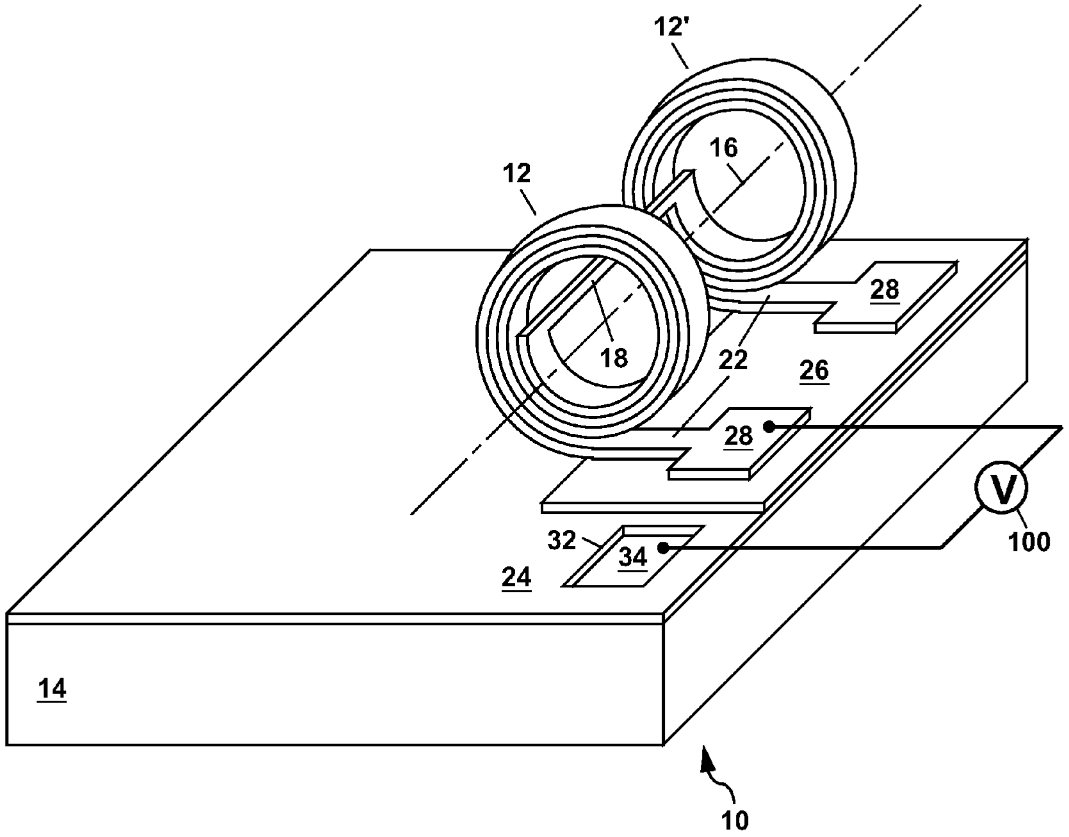
FIG. 1 shows a schematic perspective view of a first example of a tunable inductor according to the present invention.

FIG. 1 shows a schematic perspective view of a first example of a tunable inductor 10 according to the present invention. In FIG. 1, the tunable inductor 10 is a microelectromechanical (MEM) device which comprises a pair of coils 12 and 12' that are of substantially the same size and arranged side by side on a supporting substrate 14. The coils 12 and 12' are also oriented substantially parallel to each other and comprise a plurality of turns. Each coil 12 and 12' is formed from an elongate member (see FIGS. 5A-5D) which coils up about a central axis 16 which is oriented substantially parallel to the substrate 14 as shown in FIG. 1. A first end of each coil 12 and 12' is anchored to the substrate 14, and a second end of each coil 12 and 12' is used to connect the pair of coils 12 and 12' together via a bridge 18 which is suspended above the substrate 14. The second end is also referred to herein as an unanchored end.

A first electrode in this example of the present invention is formed by the substrate 14 extending beneath each coil 12 and 12'; and a second electrode 22 is located on each coil 12 and 12' and can form at least a part of the bridge 18 to electrically connect the two coils 12 and 12' together. The coils 12 and 12' in FIG. 1 are electrically isolated from the substrate 14 by an electrically-insulating thermal oxide layer 24 covering the substrate 14 and a layer of a sacrificial material 26 (also termed a sacrificial layer 26) which underlies a part of the coils 12 and 12' and defines an extent to which the coils 12 and 12' roll up.

Electrical connections can be made to the pair of coils 12 and 12' by contact pads 28 formed on the layer of the sacrificial material 26 which can comprise polycrystalline silicon (also termed polysilicon). This allows a variable inductance L provided by the tunable inductor 10 to be connected to an electronic circuit with which the tunable inductor 10 is to be used. The contact pads 28 are electrically insulated from the polysilicon sacrificial material by a silicon dioxide layer 30 (see FIG. 3) which forms a part of each coil 12 and 12'. In some embodiments of the present invention, the electrical connections to the coils 12 and 12' can comprise wiring formed on the substrate 14 (e.g. when the tunable inductor 10 is connected to an IC formed on the same substrate 14). In FIG. 1, an opening 32 can also be provided through the thermal oxide layer 24 to form a contact pad 34 on the substrate 14. The contact pad 34 can be optionally metallized with a sputter-deposited layer of metal which is also used to form the second electrode 22 overtop each coil 12 and 12'.

The tunable inductor 10 can be operated to vary the inductance L therein by applying a direct-current (DC) voltage V from a voltage source 100 between the first electrode 20 (i.e. the substrate 14 in this example) and the second electrode 22 as shown in FIG. 1. The voltage V produces an electrostatic force of attraction between the electrodes 20 and 22 with the electrostatic force being strongest beneath the coils 12 and 12' where a spacing between the electrodes 20 and 22 is smallest. The electrostatic force of attraction between the electrodes 20 and 22 will then act to unroll (i.e. uncoil) the pair of coils 12 and 12' as shown in the schematic side views of FIGS. 2A-2C until the electrostatic force is balanced by a spring force of the coils 12 and 12'.

The spring force is due to an in-plane stress gradient arising from a layered structure of the coils 12 and 12' which includes a compressively-stressed layer 30, which can be silicon dioxide, and a tensile-stressed layer 36, which can be silicon nitride. The term "in-plane stress gradient" as used herein refers to a variation in stress across the thickness of the coils 12 and 12' which is due to a difference in the magnitude or sign of the stress built into two or more stressed layers that are laminated together to form the coils 12 and 12', with the stress in each stressed layer being directed substantially in the plane of that layer.

Figure 3:
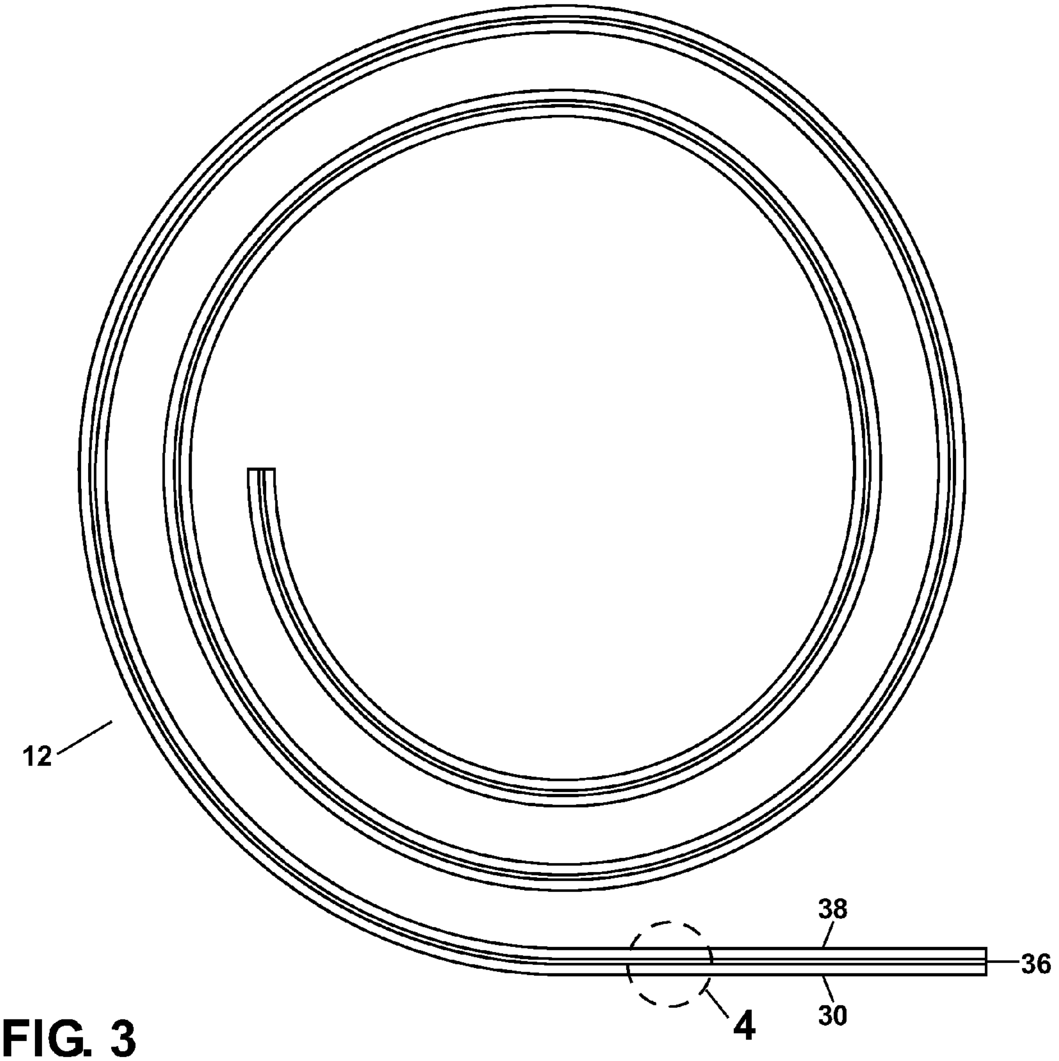
FIG. 3 shows an enlarged schematic side view of one of the coils in FIG. 1 to show the various layers therein.

A metal layer 38, which can comprise aluminum, copper or tungsten is located above the tensile-stressed silicon nitride layer 36 as shown in FIG. 3 which is an enlarged schematic side view of the coil 12 in the example of FIG. 1. This metal layer 38 forms the second electrode 22. The in-plane stress gradient within the coils 12 and 12' produced by the compressively-stressed silicon dioxide layer 30 and the tensile-stressed silicon nitride layer 36 initially causes the coils 12 and 12' to curl upward away from the substrate 14 and then to coil up as shown in FIG. 1 when the tunable inductor 10 is fabricated.

When tungsten is used for the metal layer 38, the tungsten layer 38 will be tensile stressed. This additional tensile stress in the tungsten layer 38 can aid in rolling up the coils 12 and 12'. In some cases, the tensile stress provided by the tungsten layer 38 can allow the silicon nitride layer 36 to be omitted. The tungsten layer 38 can be deposited by chemical vapor deposition (CVD) at a temperature of about 400° C. When the tungsten layer 38 is to be deposited directly on the compressively-stressed silicon dioxide layer 30 (i.e. without the silicon nitride layer 36), a 20-50 nm thick layer of titanium nitride, which is also compressively stressed, can be initially sputter deposited over the silicon dioxide layer 30 to serve as an adhesion layer since tungsten does not stick or nucleate well on silicon dioxide.

Figure 4:
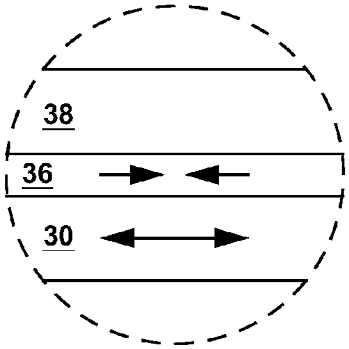
FIG. 4 shows an enlarged partial side view of the coil in FIG. 3 to show the tensile stress which is indicated by inward facing arrows, and the compressive stress which is indicated by outward facing arrows. The arrangement of tensile stress located above the compressive stress produces an in-plane stress gradient in the coils and causes the coils to roll up as shown in FIG. 3.

FIG. 4 shows an enlarged partial side view of the coil 12 in FIG. 3 to illustrate the compressive stress in the silicon dioxide layer 30, which is directed in the plane of the layer 30 and is indicated by a pair of outward-facing arrows. The tensile stress in the silicon nitride layer 36 is also directed in the plane of the layer 36, and is indicated in FIG. 4 by a pair of inward-facing arrows. The stress in the metal layer 38 is insubstantial when aluminum or copper is used, but can be substantial when tungsten is used as previously described. The compressive stress seeks to expand the silicon dioxide layer 30 in the plane of the layer 30; whereas the tensile stress seeks to contract the silicon nitride layer 36 in the plane of the layer 36. Then net result is an in-plane stress gradient which urges any unsupported portion of the coils 12 and 12' to bend up away from the substrate 14 beginning at the unanchored end thereof, and continuing to roll up the entire unsupported portion of the coils 12 and 12' as shown in FIGS. 1 and 3.

Figure 2A:
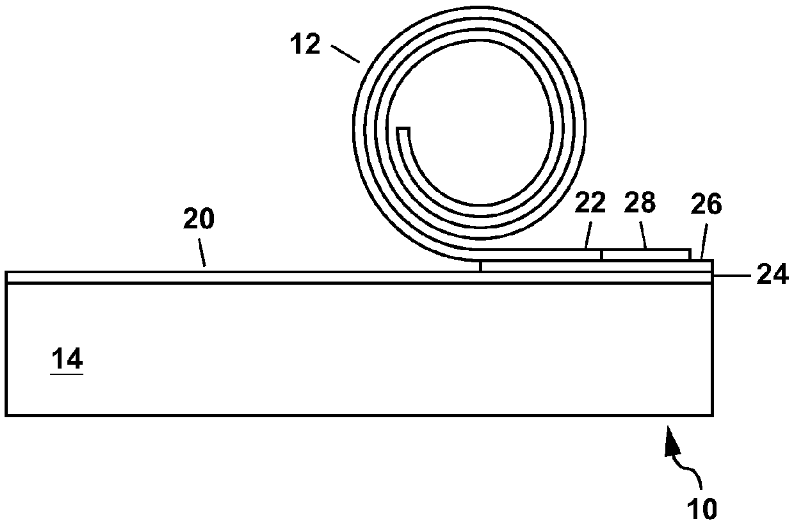
FIG. 2A shows a schematic side view of the tunable inductor of FIG. 1 without any applied voltage.

FIG. 2A shows a schematic side view corresponding to the perspective view of FIG. 1 with no applied voltage V (i.e. V=0). In this state, the inductance L of the tunable inductor 10 is largest due to the number of turns in the coils 12 and 12' being at a maximum. The exact number of turns in the coils 12 and 12' in FIGS. 1 and 2A will depend upon a length of the coils when completely unwound, and also upon how tightly the coils 12 and 12' are wound due to the in-plane stress gradient therein.

Figure 2B:
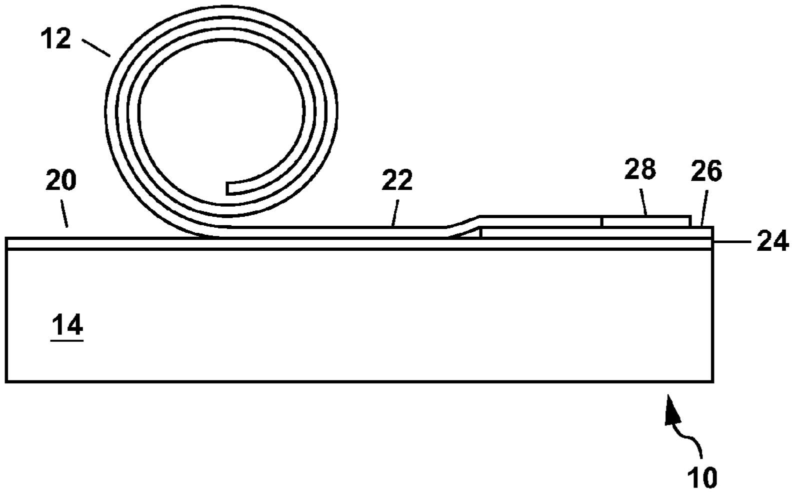
FIG. 2B shows a schematic side view of the tunable inductor of FIG. 1 with an applied voltage of sufficient magnitude to unroll the coils by about one-quarter turn.

In FIG. 2B, with an applied voltage V>0, the pair of coils 12 and 12' begin to unroll in tandem, linked together by the bridge 18 (see FIG. 1). Since the coils 12 and 12' are substantially identical with the same size and same number of turns and are linked together by the bridge 18, the coils 12 and 12' will unroll together smoothly without any warping or tangling of adjacent turns of the coils 12 and 12'. The coils 12 and 12' in FIG. 2B are shown unrolled by about one-quarter turn. The coils 12 and 12' or electrodes therebeneath can be tailored so that the electrostatic force of attraction produced by the applied voltage V does not overwhelm a restoring spring force of the coils 12 and 12' and completely unroll the coils 12 and 12'. This tailoring of the coils 12 and 12' or the electrodes therebeneath, which allows the coils 12 and 12' to be unrolled to an extent which depends upon the applied voltage V, will be described in detail hereinafter. Unrolling of the coils 12 and 12' decreases the inductance L of the tunable inductor 10.

As the coils 12 and 12' begin to unroll in FIG. 2B, the coils 12 and 12' are urged into contact with the thermal oxide layer 24 by the electrostatic force of attraction produced by the applied voltage V between the first and second electrodes 20 and 22.

Figure 2C:
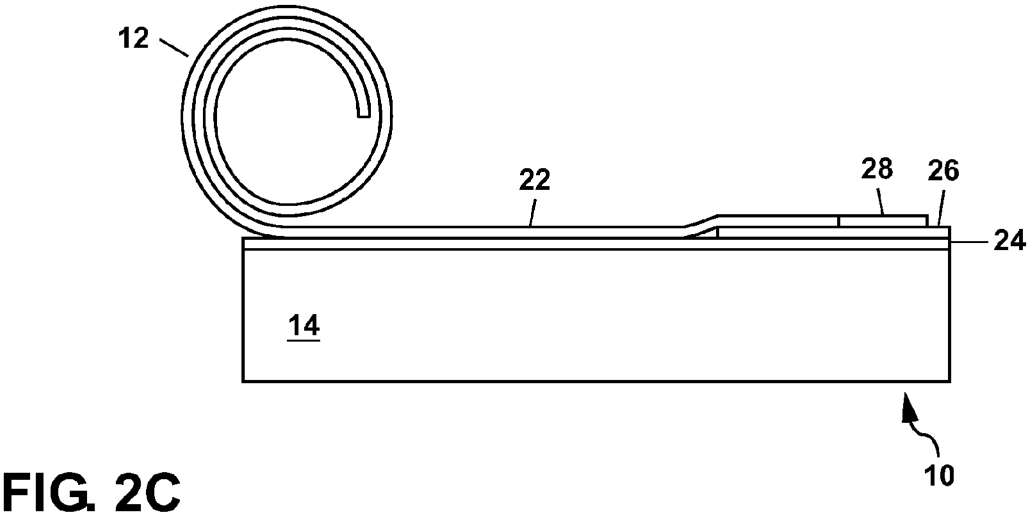
FIG. 2C shows a schematic side view of the tunable inductor of FIG. 1 with an applied voltage of sufficient magnitude to unroll the coils by about one-half turn.

In FIG. 2C, a further increase in the applied voltage V is shown to further unroll (i.e. uncoil) the coils 12 and 12' by an additional one-quarter turn, thereby further reducing the inductance L. As the coils 12 and 12' are unrolled to reduce the inductance L, the location of the central axis 16 above the substrate 14 as shown in FIG. 1 remains about the same so long as there is at least one turn remaining on the coils 12 and 12'.

Those skilled in the art will understand that the inductance L of the pair of coils 12 and 12' comprises a self inductance due to each coil 12 and 12', and a mutual inductance due to a coupling between the two coils 12 and 12'. The self inductance depends upon the number of turns in each coil 12 and 12' while the mutual inductance depends upon the spacing between the coils 12 and 12', and the direction of current flow therein.

Further increasing the voltage V beyond that in FIG. 2C will result in the coils 12 and 12' continuing to unroll with a corresponding reduction in the inductance L. At a sufficiently large voltage V, the coils 12 and 12' can be completely unrolled at which point the inductance L will be a minimum. Reducing the voltage V to zero will roll up the coils 12 and 12' as shown in FIGS. 1 and 2A due to the restoring spring force generated by the in-plane stress gradient. This process of unrolling and rolling up the coils 12 and 12' can be repeated a number of times as needed for a particular electronic circuit such as an oscillator circuit, tunable filter, matching network, etc., to which the tunable inductor 10 is connected. The electronic circuit, which can be connected between the pair of contact pads 28 in FIG. 1, can be located external to the substrate 14, or in some instances can be located on the same substrate 14 with the tunable inductor 10 as an IC.

In the tunable inductor 10 of the present invention, the inductance L can be changed electrostatically over a relatively large range which can be up to ten nanoHenries (nH) or more by using a DC voltage V applied between the electrodes 20 and 22 without the need for flowing a relatively large DC current through the tunable inductor 10 as in other types of tunable inductors known to the art.

Fabrication of the tunable inductor 10 of FIG. 1 will now be described in terms of fabrication on a semiconductor substrate comprising silicon. Those skilled in the art will understand that the tunable inductor 10 of the present invention can be fabricated on other types of semiconductor substrates 14, including substrates formed of germanium or gallium arsenide. Those skilled in the art will also understand that the tunable inductor 10 of the present invention can also be fabricated on dielectric substrates 14, including glass, ceramic, sapphire, alumina, fused silica, quartz, etc.

To fabricate the tunable inductor 10 of FIG. 1, a plurality of material layers, which are compatible with semiconductor IC and MEM device fabrication, can be deposited on a silicon substrate 14. The substrate 14 can be initially prepared by forming the thermal oxide layer 24 which can be, for example, about 0.4 μm thick. The thermal oxide layer 24 can be formed using a conventional wet or dry thermal oxidation process at an elevated temperature (e.g. 1050° C.) whereby silicon at exposed surfaces of a silicon substrate 14 is converted into silicon dioxide ($SiO_2$). In other embodiments of the present invention where a silicon substrate 14 is not used, a layer of deposited silicon dioxide can be substituted for the thermal oxide layer 24. In some cases, the thermal oxide layer 24 or a silicon dioxide layer can be omitted (e.g. when the substrate 14 comprises an electrically insulating material such as glass upon which a polysilicon sacrificial layer 26 can be directly deposited).

After formation of the thermal oxide layer on the substrate 14, the sacrificial layer 26 comprising polysilicon about 0.4 μm thick can be blanket deposited over the substrate 14 by low-pressure chemical vapor deposition (LPCVD) at a temperature of 580° C. The compressively-stressed silicon dioxide layer 30 can then be blanket deposited over the silicon substrate 14 by chemical vapor deposition (CVD). This layer 30 can be, for example, about 0.4 μm.

After deposition of the compressively-stressed silicon dioxide layer 30, the tensile-stressed silicon nitride layer 36 can be blanket deposited over the silicon substrate 14 to a thickness of, for example, 20 nanometers. The silicon dioxide layer 30 and the silicon nitride layer 36 can also be used to form a part of the bridge 18 together with a subsequently deposited metal layer 38. The bridge 18, which connects the unanchored ends of the coils 12 and 12' together, can have a width which is less than or equal to the width of the coils 12 and 12'.

The metal layer 38, which can comprise aluminum about 0.4 μm thick, can then be deposited over the substrate 14 by evaporation or sputtering. The aluminum layer 38 has relatively low stress compared to the underlying silicon nitride and silicon dioxide layers 36 and 30, respectively. The metal layer 38 forms the second electrode 22 on the coils 12 and 12' and also forms a part of the bridge 18. Additionally, the metal layer 38 forms the contact pads 28 and can also be deposited overtop the contact pad 34 when the opening 32 has been formed prior to depositing the metal layer 38.

After deposition of the plurality of material layers as described above, reactive ion etching using a photolithographically-defined etch mask (not shown) can be used to etch down to the sacrificial material 26 and define the shape of the various elements of the tunable inductor 10, including the coils 12 and 12', the bridge 18, and the contact pads 28. At this point in the fabrication process, the coils 12 and 12' will be in a flattened state since they are still attached to the underlying sacrificial material 26.

A plurality of micron-sized or larger etch-release holes 40 can be etched through the various material layers (i.e. the layers 30, 36 and 38) forming the coils 12 and 12' in the reactive ion etching step used to define the shape of the coils 12 and 12'. These etch-release holes 40 are useful to expose the underlying sacrificial material 26 so that a subsequent selective etching step can remove the sacrificial material 26 faster and more thoroughly. The etch-release holes 40 can be circular, square, rectangular, or of any arbitrary shape.

Figure 5A:
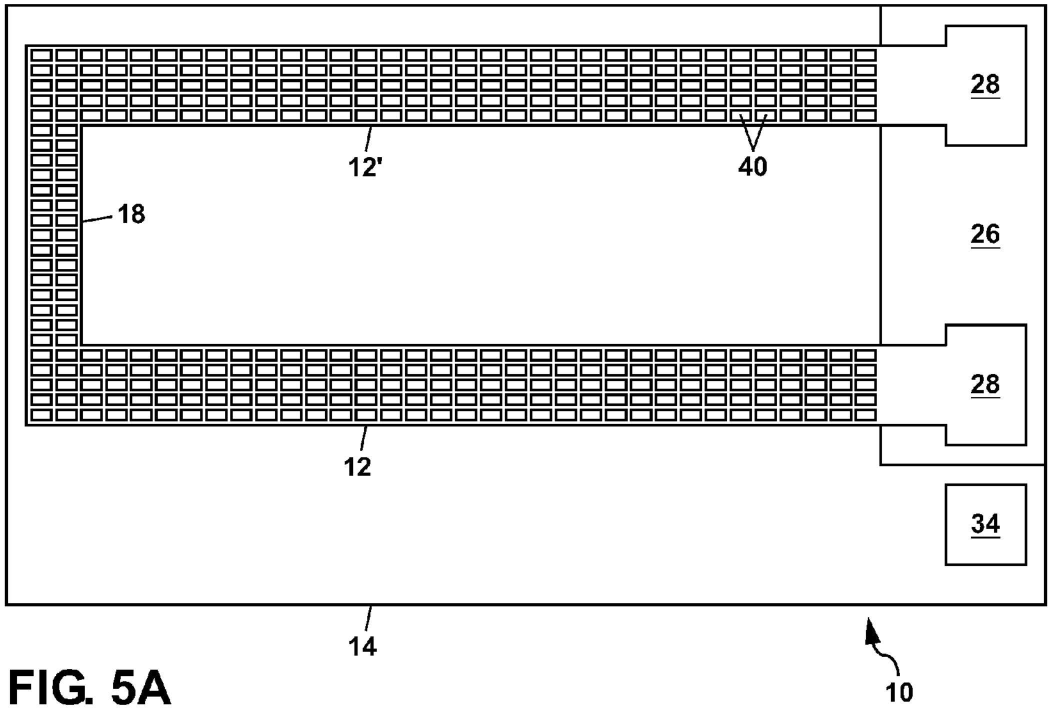
FIG. 5A shows a schematic plan view of a tunable inductor with the coils in a flattened state and having a lattice structure.

FIG. 5A shows an embodiment of the device 10 of FIG. 1 where a plurality of rectangular etch-release holes 40 have been provided in the coils 12 and 12'. In this schematic plan view of the device 10 after etching down to define the shape of the coils 12 and 12' and removal of the etch mask, the rectangular etch-release holes 40 form a lattice structure for the coils 12 and 12' which can aid in removing the sacrificial material beneath the coils 12 and 12'. The lattice structure in FIG. 5A can also extend downward through the thermal oxide layer 24, if desired, to reduce the voltage required for actuation of the tunable inductor 10. In other embodiments of the present invention, the first electrode 20 can have this same lattice structure (e.g. when a single reactive ion etch step is used to define the shapes of both the first electrode 20 and the coils 12 and 12' and bridge 18).

Figure 5B:
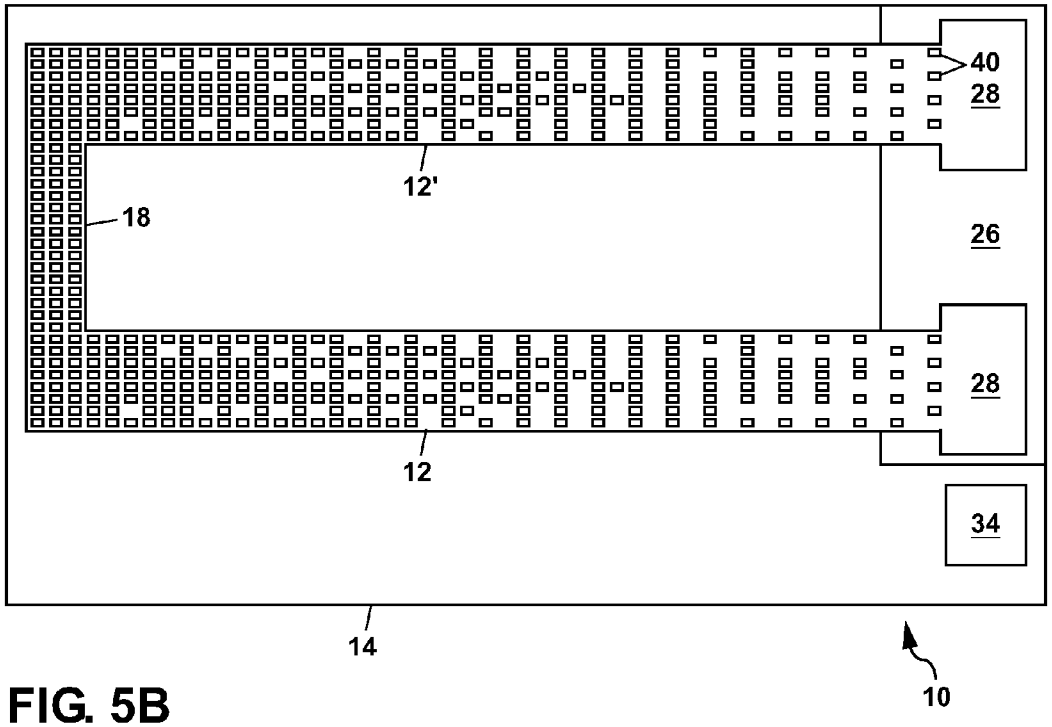
FIG. 5B shows a schematic plan view of a tunable inductor with the coils in a flattened state and having a structure of etch-release holes which vary in density along the length of the coils.

To control the extent of unrolling of the coils 12 and 12', the density (i.e. number per unit area) of the etch-release holes 40 can be varied along the length of the coils 12 and 12'. This is schematically illustrated in FIG. 5B which shows a schematic plan view of an embodiment of the tunable inductor 10 with the coils 12 and 12' in a completely unrolled state. As the density of the etch-release holes 40 increases along the length of each coil 12 and 12' towards the unanchored end thereof as shown in FIG. 5B, this decreases the area of electrically conductive material in the coils 12 and 12' due to the increasing area taken up by the etch-release holes 40. As a result, the electrostatic force of attraction between the coils 12 and 12' and the underlying electrode 20 will be reduced as the coils 12 and 12' unwind to a larger extent so that a larger voltage V will be needed to further unroll the coils 12 and 12'. In this way, the extent of unrolling the coils can be made proportional to the applied voltage V so that the inductance L provided by the coils 12 and 12' will vary inversely proportional to the applied voltage V.

The density of the etch-release holes 40 in FIG. 5B can be made to vary linearly or non-linearly with distance along the coils 12 and 12' to control exactly how the inductance L in the tunable inductor 10 varies with the applied voltage V. Alternately, the variation in density of the etch-release holes 40 can be stepped along the length of the coils 12 and 12' to allow the inductance L to be changed in discrete steps with the applied voltage V which can also be stepped.

Figure 5C:
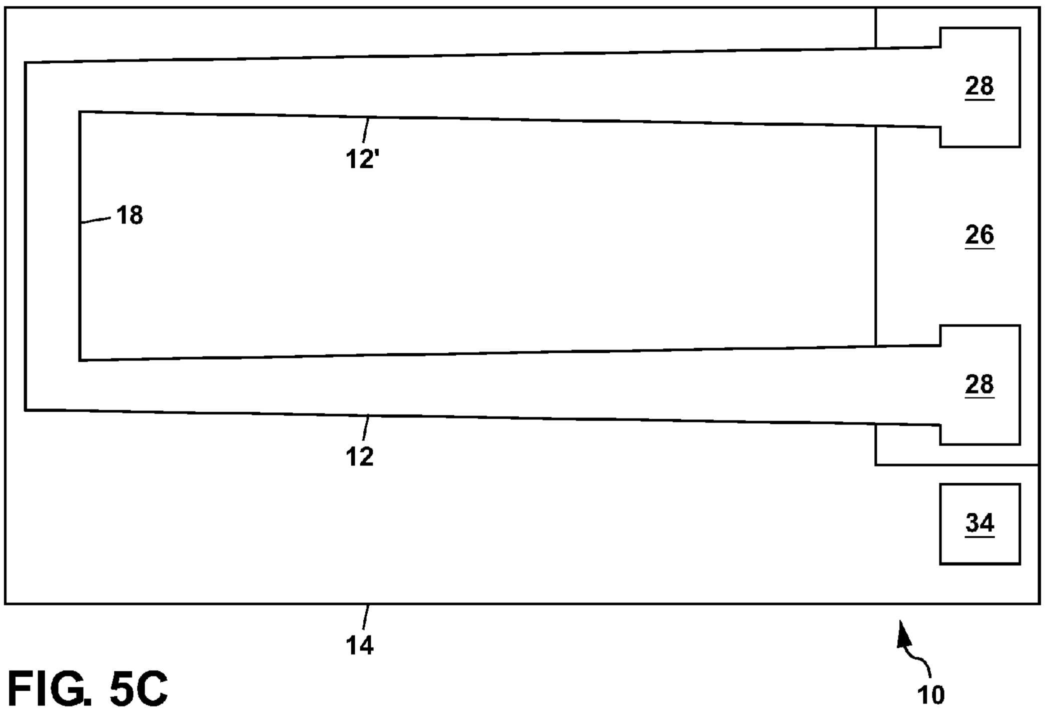
FIG. 5C shows a schematic plan view of a tunable inductor with the coils in a flattened state and having a tapered shape.
Figure 5D:
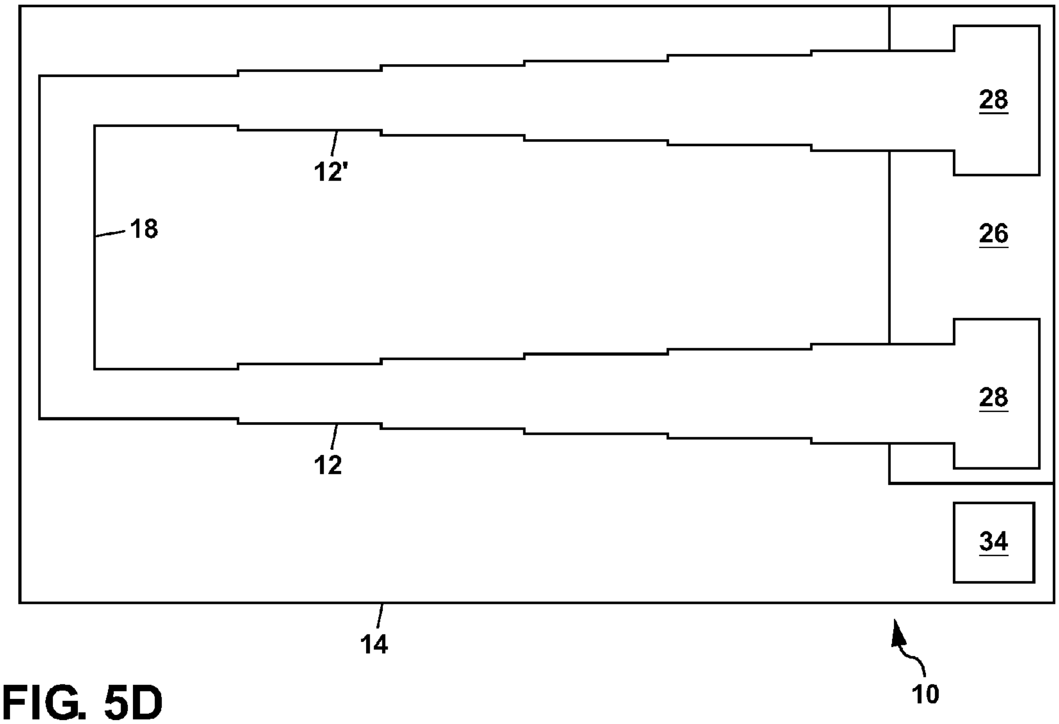
FIG. 5D shows a schematic plan view of a tunable inductor with the coils in a flattened state and having a stepped shape.

Other ways are possible to make the extent of unrolling of the coils 12 and 12' proportional to the applied voltage V for control of the inductance L of the tunable inductor 10. For example, the coils 12 and 12' can have a tapered shape as shown in the schematic plan view of FIG. 5C, or a stepped shape as shown in FIG. 5D. In each case, the area of the coils 12 and 12' upon which the electrostatic force of attraction will act will then decrease with distance towards the unanchored end of the coils 12 and 12'. This tapered or stepped shape is also useful to assist the flattened coils 12 and 12' in coiling up smoothly from the unanchored end thereof (i.e. the end nearest the bridge 18) without tangling. Although both sides of each coil 12 and 12' in FIGS. 5C and 5D are shown tapered or stepped inward on both sides of each coil 12 and 12', those skilled in the art will understand that the tapering or stepping can be located on only one side of each coil 12 and 12'. Although not shown in FIGS. 5C and 5D, a plurality of etch-release holes 40 can also be provided in the coils 12 and 12'.

The length of the flattened coils 12 and 12' in FIGS. 5A-5D can be, for example, a few millimeters (mm) or more, with the width of the flattened coils 12 and 12' being, for example, 0.1-1 mm. When the coils 12 and 12' are formed as shown in FIGS. 5A-5D, with a first electrode 20 being formed on the substrate 12, as will be described hereinafter, the first electrode 20 can be optionally formed with the same structure as the coils 12 and 12' (i.e. having a lattice structure as shown in FIG. 5A, having a varying density of etch release holes 40 as shown in FIG. 5B, having a tapered shape as showing in FIG. 5C, or having a stepped shape as shown in FIG. 5D.)

After patterning the various elements of the tunable inductor 10 by reactive ion etching, the polysilicon sacrificial material 26 can be removed using a selective etchant which can be a dry fluorine-based etchant (e.g. gaseous xenon difluoride vapor, or sulfur hexafluoride in a downstream plasma etching system). The use of a dry selective etchant reduces the possibility of stiction (i.e. adhesion) of the flattened coils 12 and 12' to the thermal oxide layer 24, or to the underlying substrate 14. The use of a dry selective etchant also prevents exposure the coils 12 and 12' to fluid forces which are present with a wet etchant and the possibility of deforming or tangling the coils 12 and 12' due to such fluid forces.

The dry fluorine-based etchant removes exposed portions of the polysilicon sacrificial material 26 while not substantially chemically attacking the other material layers including the thermal oxide layer 24, the silicon dioxide layer 30, the silicon nitride layer 36, and the metal layer 38. As the sacrificial material 26 is removed from beneath the flattened coils 12 and 12', the coils will begin to roll up beginning at the unanchored end of the coils 12 and 12' until the coils 12 and 12' are completely rolled up as shown in FIG. 1. The diameter of the rolled-up coils 12 and 12' will depend upon the length and thickness of the silicon nitride and metal layers 36 and 38, respectively, and how tightly they are coiled due to the in-plane stress gradient. As an example, the rolled up coils 12 and 12' can have a diameter of about 1 millimeter or less when the length of the coils. 12 and 12' is 4-5 mm and the thicknesses of the layers 30, 36 and 38 are as previously described. In the rolled up coils 12 and 12', adjacent turns of the coils are electrically isolated from each other by the silicon dioxide and silicon nitride layers 30 and 36, respectively, which are both electrically insulating.

In some embodiments of the present invention, the tunable inductor 10 can be fabricated on a semiconductor substrate 14 (e.g. comprising silicon, germanium, gallium arsenide, etc.) which also includes an IC comprising a plurality of interconnected circuit elements such as transistors, resistors, capacitors, or a combination thereof. These embodiments of the present invention can be formed by first fabricating the IC on the substrate 14 using a series of well-known semiconductor IC processing steps. One or more tunable inductors 10 can then be fabricated on the semiconductor substrate 14 alongside the IC, or above the IC and subsequently packaged together with the IC in a hermetically-sealed package.

To prevent any damage to the IC, the process steps used to fabricate one or more tunable inductors 10 on the same substrate 14 as the IC can be carried out at a relatively low temperature of about 400° C. or less. This can entail the use of plasma-enhanced chemical vapor deposition (PECVD) to deposit the polysilicon sacrificial material 26, the silicon dioxide layer 30 and the silicon nitride layer 36 rather than the use of LPCVD and CVD as described previously. Additionally, when one or more tunable inductors 10 are to be fabricated above the IC, in some cases, a layer of an interconnect metallization for the IC can be used to form the first electrode 20. The interconnect metallization can comprise, for example, aluminum, copper or tungsten.

Figure 6:
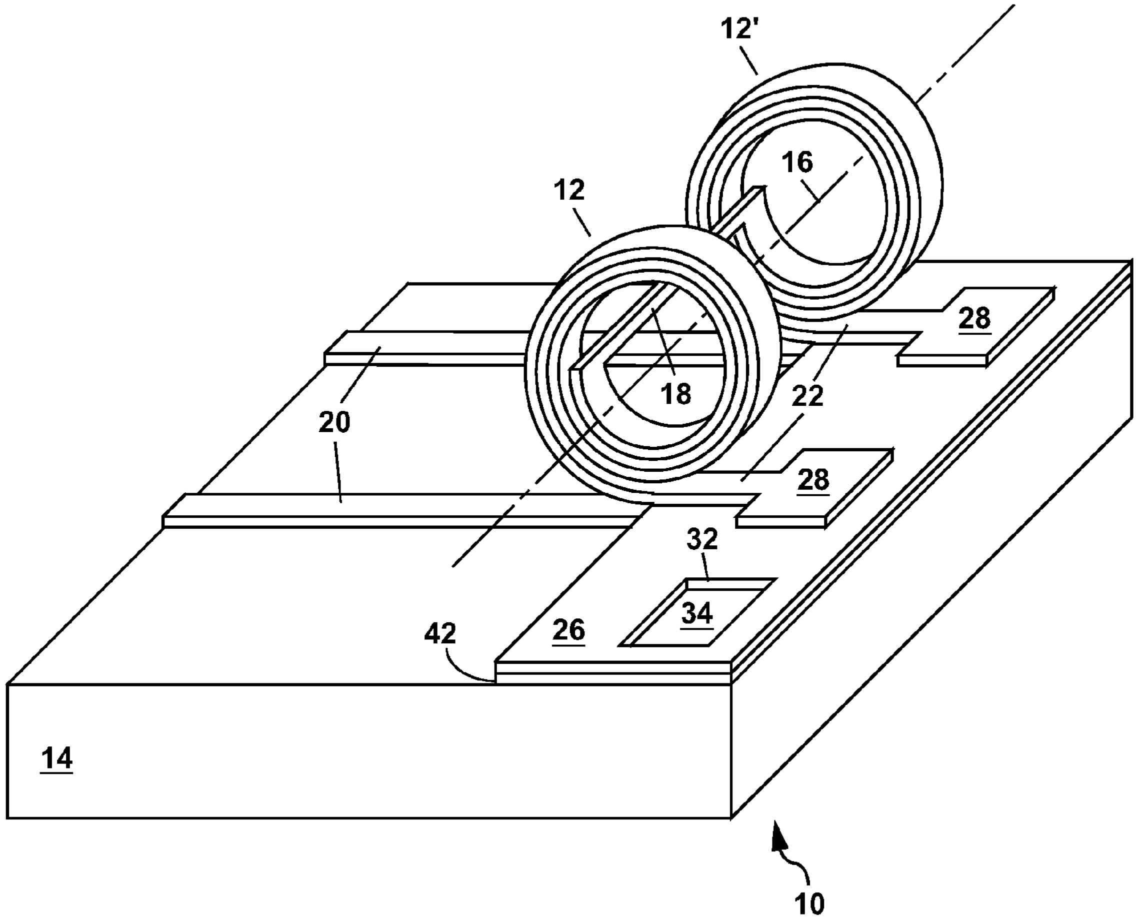
FIG. 6 shows a schematic perspective view of a second example of a tunable inductor according to the present invention.
Figure 7A:
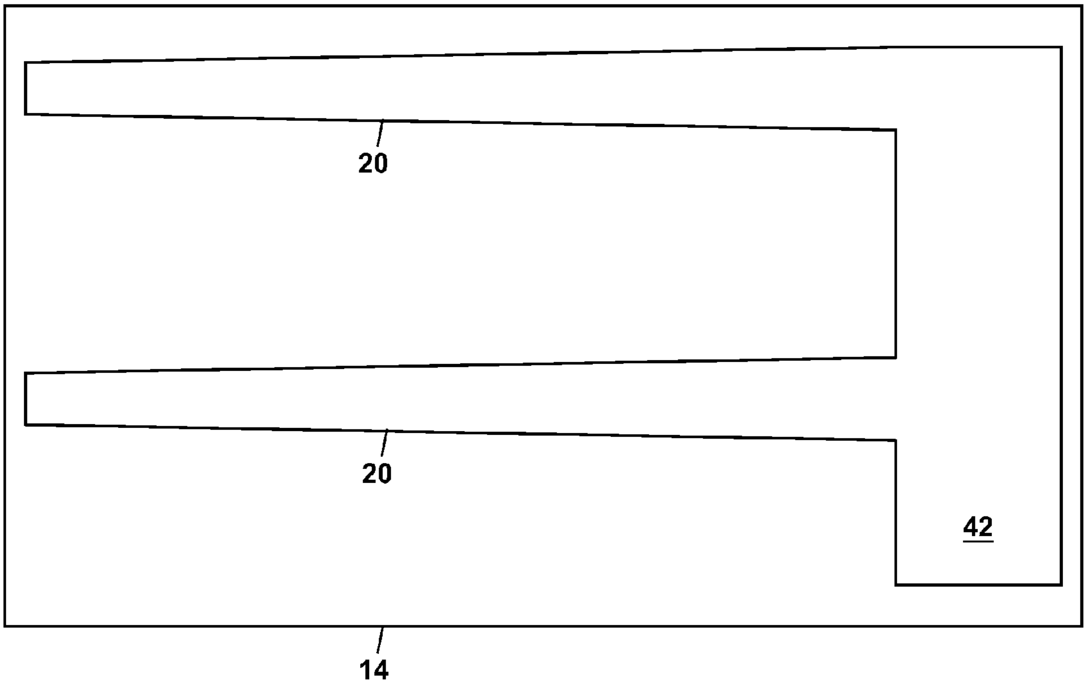
FIGS. 7A-7C schematically illustrate in plan view different shapes which can be used for the first electrode in the tunable inductor of FIG. 6. Note that the coils and the sacrificial layer have been removed in FIGS. 7A-7C to better show the first electrode which is formed from a layer of polysilicon or metal.
Figure 7B:
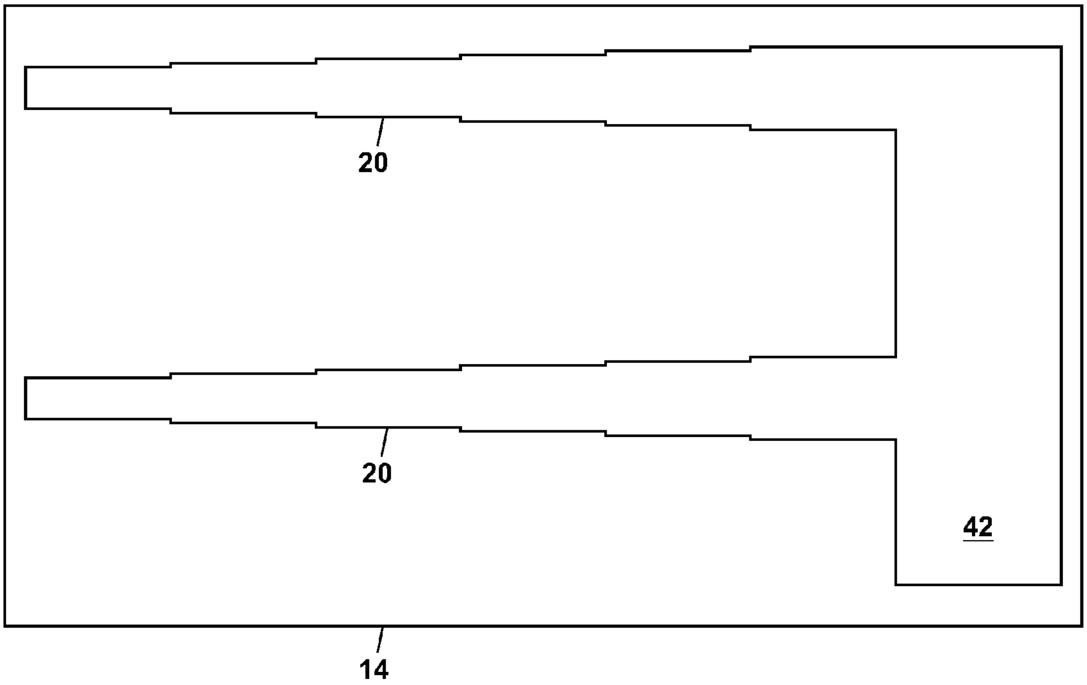
Figure 7C:
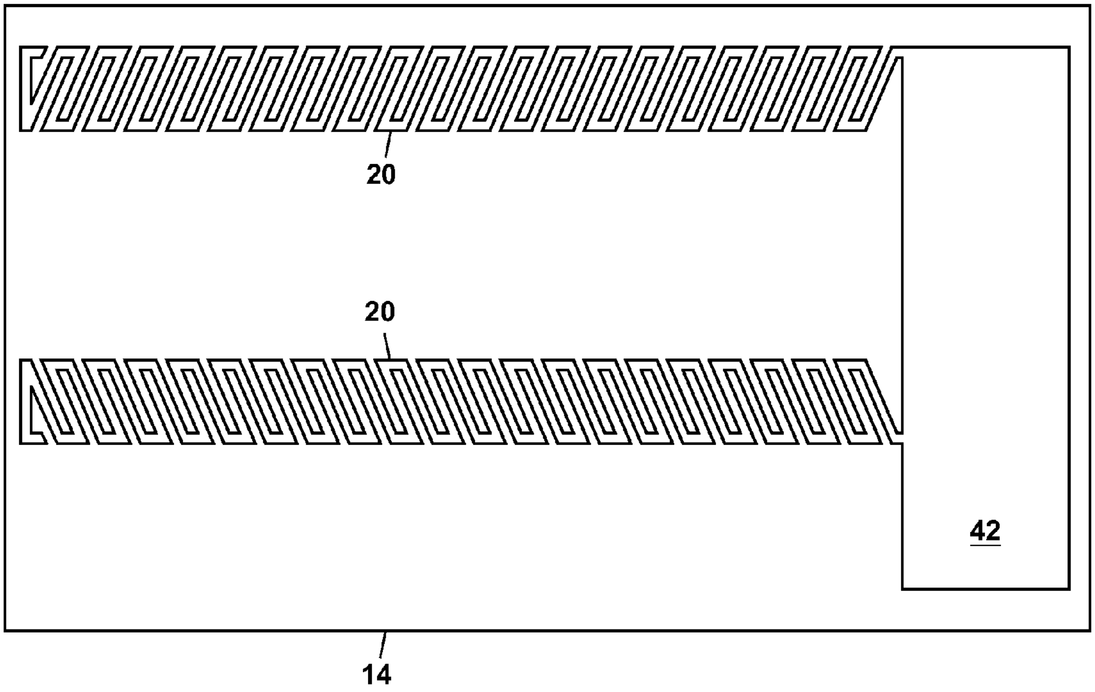

A schematic perspective view of a second example of the tunable inductor 10 of the present invention is shown in FIG. 6. In this second example, the first electrode 20 can comprise polysilicon or a metal such as aluminum, copper or tungsten, which can be optionally overcoated with a thin (e.g. 0.1-0.5 μm) electrically-insulating layer of silicon dioxide or silicon nitride. When the first electrode 20 is formed from a blanket-deposited layer 42 of polysilicon or metal, a portion of the layer 42 can be left in place beneath the sacrificial layer 26 as shown in FIGS. 7A-7C to connect each elongate portion of the electrode 20 together and also to form the contact pad 34 which is electrically connected to the electrode 20 through the layer 42. When the first electrode 20 in the example of FIG. 6 is formed from polysilicon, the polysilicon can be doped during deposition with boron or phosphorous for electrical conductivity. As previously described, the first electrode 20 can also be formed from an interconnect metallization used for an IC formed beneath the tunable inductor 10, or alternately form a deposited metal layer.

In the example of FIG. 6, the substrate 14 can comprise an electrically-insulating substrate 14 (e.g. an undoped semiconductor substrate such as undoped silicon, or a glass, ceramic, sapphire, alumina, quartz or fused silica substrate). When a semiconductor substrate is used, layer of a thermal oxide, silicon dioxide or silicon nitride can be provided over the semiconductor substrate 14 prior to depositing the metal layer 42, if needed, to electrically isolate the first electrode 20 from the semiconductor substrate 14.

In the example of FIG. 6, the remaining layers used for the structure of the tunable inductor 10 can be as previously described (i.e. a polysilicon sacrificial layer 26, a compressively-stressed silicon dioxide layer 30, a tensile-stressed silicon nitride layer 36, and a metal layer 38, which can comprise aluminum, copper or tungsten).

Fabrication of this example of the present invention can proceed substantially the same as that described previously except that the first electrode 20 can be patterned using the same reactive ion etching step used to pattern the of the coils 12 and 12', or in some cases the first electrode 20 can be patterned using a separate reactive ion etching step when the shape of the first electrode 20 is different from the shape of the coils 12 and 12'. Although not shown in FIGS. 6 and 7A-7C, the electrode 20 can also comprise a region which is initially beneath the bridge 18 when the coils 12 and 12' are in a flattened state when a single reactive ion etching step is used to form both the first electrode 20 and the coils 12 and 12'. Alternately, the metal or polysilicon used to form the first electrode 20 can be deposited and patterned separately by reactive ion etching prior to depositing and patterning the remaining layers. This will generally be the case if the first electrode 20 comprises polysilicon since the polysilicon first electrode 20 will need to be overcoated with a thin (e.g. 0.1-0.5 μm) layer of silicon dioxide or silicon nitride to protect them from being etched away during removal of the overlying polysilicon sacrificial material 26.

Those skilled in the art will understand that the first electrode 20 and the coils 12 and 12' can, in some instances, have different lengths. As an example, the length of the elongate portions of the first electrode 20 can be less than the length of the coils 12 and 12'. This can be useful to limit a minimum value of the inductance L, or to prevent the coils 12 and 12' from unrolling completely.

The first electrode 20 can have a uniform width as shown in FIG. 6. Alternately, the first electrode 20 can be tapered as shown in the schematic plan view of FIG. 7A which has omitted the coils 12 and 12' and the sacrificial material 26 to better show the shape of the first electrode 20. The first electrode 20 can also be stepped as shown in FIG. 7B. When the first electrode 20 is tapered or stepped, the coils 12 and 12' can also be tapered or stepped, or alternately the coils 12 and 12' can have a substantially uniform width. In any case, the tapered or stepped first electrode 20 provides a way of making the inductance L of the tunable inductor 10 to vary proportionately with the applied voltage V since the tapered or stepped shape of the first electrode 20 will decrease the electrostatic force of attraction with distance so that an increasing voltage V will be needed to further unroll the coils 12 and 12'.

Another way of forming the first electrode 20 is shown in the schematic plan view of FIG. 7C which again omits the coils 12 and 12' and the sacrificial material 26 to better show the shape of the first electrode 20. In FIG. 7C, each elongate portion of the first electrode 20 has a zigzag shape (also termed a serpentine shape). This zigzag shape is useful to provide an increased resistance for the first electrode 20 which can reduce RF losses in the tunable inductor 10. The zigzag shape of the first electrode 20 can also be slanted as shown in FIG. 7C. This is useful to provide a more uniform electrostatic force of attraction between the electrode 20 and the coils 12 and 12' as the coils 12 and 12' unroll and thereby eliminate the possibility of any local minima in the electrostatic force of attraction which might otherwise exist and impede the unrolling of the coils 12 and 12' as the inductance L is changed.

With the first electrode 20 being formed of metal or polysilicon and patterned as described above, the polysilicon sacrificial material 26 after deposition will generally not be planar over the first electrode 20. A chemical-mechanical polishing (CMP) step can be used after deposition of the polysilicon sacrificial material 26 to provide a planar surface for the deposition of the remaining layers used to form the tunable inductor 10 in FIG. 6.

After the various layers have been deposited and patterned, the polysilicon sacrificial material can be removed as described previously to release the flattened coils 12 and 12' to roll up due to the in-plane stress gradient. Operation of this device 10 is similar to that described previously with reference to FIGS. 1 and 2A-2C.

Figure 8:
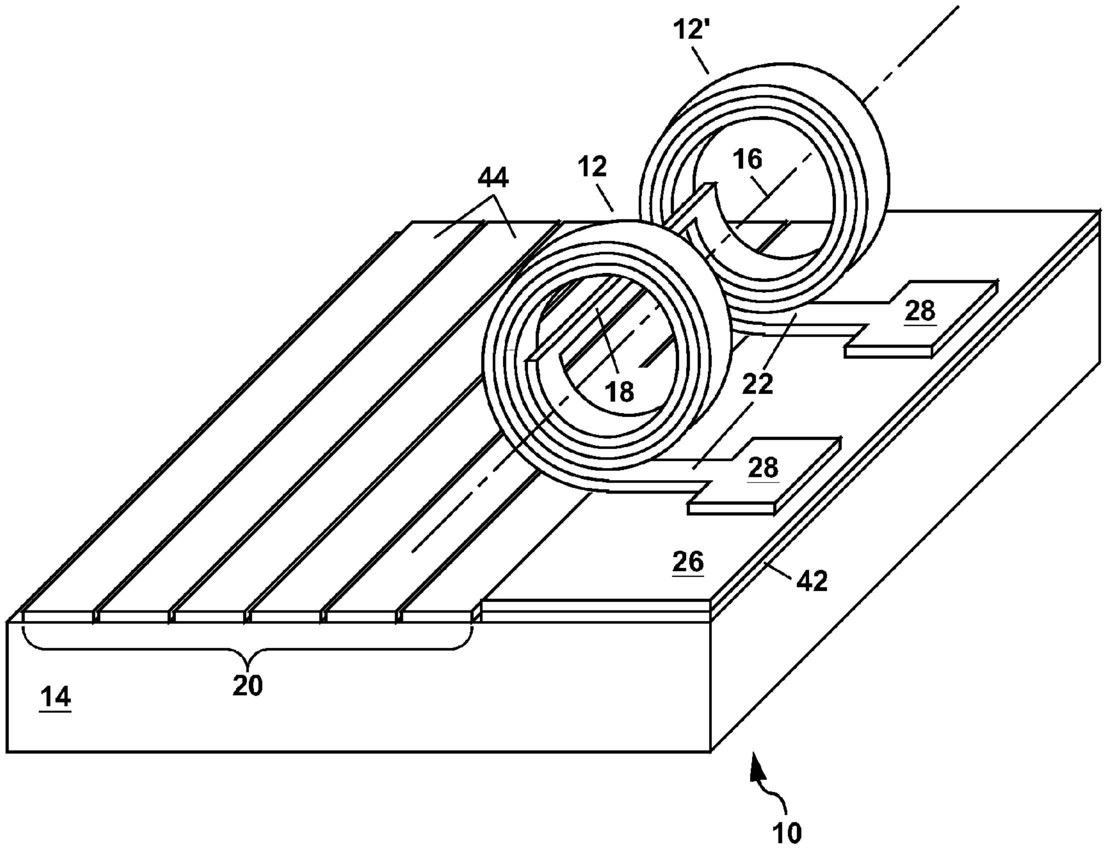
FIG. 8 shows a schematic perspective view of a third example of a tunable inductor according to the present invention.

FIG. 8 shows a schematic perspective view of a third example of a tunable inductor 10 according to the present invention. In FIG. 8, the tunable inductor 10 comprises first electrode 20 which is formed as a segmented electrode to control and vary the inductance L of the tunable inductor 10. The segmented first electrode 20 in FIG. 8 comprises a plurality of electrodes 44 which are spaced apart in a side by side arrangement. The electrodes 44, which can be, for example 0.1-0.5 mm wide and spaced apart by up to a few microns, can be electrically isolated from each other so that they can be independently addressed, or addressed in sets.

Addressing of the segmented first electrode 20 in FIG. 8 to provide a digitally selected predetermined value of the inductance L can be accomplished using one or more DC programming voltages. As a particular set of electrodes 44 extending outward away from the rolled up coils 12 and 12' is addressed with the DC programming voltage, which can be the same or different for each electrode 44 in the set, the pair of coils 12 and 12' will be urged electrostatically to unroll to an extent corresponding to the number of electrodes 44 in that particular set (i.e. the coils 12 and 12' will unroll a distance which is approximately equal the combined width of the electrodes 44 in that set). This can provide discrete stepped values of the inductance L which can be digitally selected to allow a discrete tuning of an electronic circuit to which the tunable inductor 10 is connected. The term "digitally selected" as used herein refers to the ability to address particular sets of the electrodes 44 in the tunable inductor 10 and thereby select a number of discrete values of the inductance L between a maximum inductance $L_{Max}$ and a minimum inductance $L_{Min}$.

When different DC programming voltages are used to address the individual electrodes 44 in the segmented first electrode 20, the DC programming voltages can be the same or different depending upon the exact shape of the coils 12 and 12'. The different DC programming voltages can be applied in a stepped sequence to unroll the coils 12 and 12' as needed to select a particular value of the inductance L, and then removed in the same stepped sequence to smoothly roll up the coils 12 and 12' when the inductance L is to be increased.

When a single DC programming voltage is used, the single DC programming voltage can be set to the maximum voltage $V_{Max}$ that is required to unroll the coils 12 and 12' to an extent needed to provide a predetermined variation in the inductance L. This maximum voltage $V_{Max}$ can be up to a few tens of volts or more, and will depend upon the exact thickness of the layers 30 and 36 between the electrodes 20 and 22, and will also depend upon the thickness of any electrically-insulating layer that may be provided overtop the segmented first electrode 20. The single DC programming voltage can be applied to and removed from the individual electrodes 44 with a predetermined time constant so that the coils 12 and 12' will smoothly unroll or roll up to change the inductance L of the tunable inductor 10.

Fabrication of the tunable inductor 10 of FIG. 8 can be performed using the same material layers previously described with reference to the second example of FIG. 6. After deposition of the polysilicon or metal layer (e.g. aluminum, copper or tungsten) used to form the segmented first electrode 20, the individual electrodes 44 can be defined by a reactive ion etching step. The segmented first electrode 20 can then be optionally coated with a layer of an electrically-insulating material (e.g. silicon dioxide or silicon nitride), with the electrically-insulating material being planarized using a CMP step. A layer of the polysilicon sacrificial material 26 can then be blanket deposited over the substrate 14 and planarized by CMP, if needed, to provide a flat surface for subsequent deposition of the various layers 30, 36 and 38 used to form the coils 12 and 12'.

A second reactive ion etch step can then be used to pattern the layers 30, 36 and 38 to define the shapes of the flattened coils 12 and 12' and the bridge 18. In this case, the reactive ion etching step needs only to etch down to expose the polysilicon sacrificial material 26 beneath the coils 12 and 12'. The coils 12 and 12' and bridge 18 can then be released using the dry selective etchant to selectively remove the polysilicon sacrificial material 26 and allow the coils 12 and 12' to roll up in tandem beginning at the unanchored end thereof.

In other embodiments of the present invention, the bridge 18 can extend between the coils 12 and 12' along a portion or the entire length thereof. In these embodiments, a metal portion of the bridge 18 formed from the metal layer 38 will generally have a width that is less than or equal to the width of each coil 12 or 12'. The remainder of the bridge 18, which can be formed from the silicon dioxide and silicon nitride layers 30 and 36, can extend outward from the bridge 18 toward the anchored end of the coils 12 and 12' for a predetermined distance which, in some cases, can be up to the entire length of the coils 12 and 12'. A plurality of etch-release holes 40 can be formed through the layers 30 and 36 in the bridge 18 as needed to aid in removing the underlying polysilicon sacrificial material 26 using the selective etchant. In these embodiments of the present invention where the bridge 18 extends between the coils 12 and 12' up to the entire length thereof, a spacing between the coils 12 and 12' will generally be smaller than the length of the coils 12 and 12' so that the in-plane stress gradient will cause the coils 12 and 12' to roll up while the bridge 18 remains substantially flat in a direction parallel to the central axis 16 about which the coils 12 and 12' wind. As an example, the coils can be spaced apart by a distance of 0.5-1 millimeter while the length of the coils 12 and 12' can be 4-5 millimeters or more.

In yet other embodiments of the present invention the first electrode 20 in FIG. 6 can be provided as a flat plate which can act as a ground plane to electrically isolate the tunable inductor 10 from the substrate 14, or from an IC formed on the substrate 14 beneath the tunable inductor 10, thereby minimizing capacitive and magnetic coupling to the substrate 14 or to the IC. Such a single plate first electrode 20 can be formed by separately patterning the metal layer 42 used to form the first electrode 20 in FIG. 6, or alternately by not etching through the metal layer 42 when the shapes of the flattened coils 12 and 12' and bridge 18 are defined by reactive ion etching.

Although the metal layer 38 on the coils 12 and 12', which is used for each second electrode 22, has been described herein as being located above the compressively-stressed silicon dioxide layer 30 and the tensile-stressed silicon nitride layer 36 (see FIGS. 3 and 4), in other embodiments of the present invention, the metal layer 38 can be located beneath the layers 30 and 36. When this is done, a thin (0.1-0.5 μm) electrically-insulating layer (e.g. silicon dioxide or silicon nitride) can be provided overtop the first electrode 20 to prevent the possibility of short circuiting the electrodes 20 and 22 during operation of the tunable inductor 10.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A tunable inductor, comprising:

a pair of coils of substantially the same size arranged side by side and coiled about a central axis which is oriented substantially parallel to a supporting substrate, with each coil comprising a plurality of turns and having a first end anchored to the supporting substrate and a second end where the pair of coils are connected together by a bridge which is suspended above the substrate;

a first electrode extending beneath each coil; and a second electrode forming at least a part of the bridge and further being located on each coil to at least partially uncoil the pair of coils in response to a voltage applied between the first and second electrodes, to tune an inductance of the tunable inductor.

2. The tunable inductor of claim 1 wherein each coil comprises a layer of a compressively-stressed material, and a layer of a tensile-stressed material.

3. The tunable inductor of claim 2 wherein the compressively-stressed material comprises silicon dioxide, and the tensile-stressed material comprises silicon nitride.

4. The tunable inductor of claim 1 wherein each coil has a shape which is tapered or stepped with distance from the first end to the second end.

5. The tunable inductor of claim 1 wherein each coil has a density of etch-release holes therein which varies with distance from the first end to the second end.

6. The tunable inductor of claim 1 wherein each coil has a lattice structure.

7. The tunable inductor of claim 1 wherein the first electrode is tapered or stepped.

8. The tunable inductor of claim 1 wherein the first electrode has a zigzag shape.

9. The tunable inductor of claim 1 wherein the first electrode is a segmented electrode.

10. The tunable inductor of claim 1 wherein the supporting substrate comprises a semiconductor substrate.

11. The tunable inductor of claim 1 wherein the second electrode comprises a metal selected from the group consisting of aluminum, copper and tungsten.

12. A tunable inductor, comprising:

a substrate;

a pair of elongate members formed side by side on the substrate having one end of each elongate members anchored to the substrate and connected together at an opposite unanchored end, with the pair of elongate members having an in-plane stress gradient which urges the unanchored end of the pair of elongate members to coil away from the substrate and to form a pair of substantially identically-sized multi-turn coils from the pair of elongate members, with each multi-turn coil being formed about a central axis which is substantially parallel to the substrate;

a first electrode extending beneath the pair of elongate members; and a second electrode formed on the pair of elongate members to at least partially uncoil the pair of substantially identically-sized multi-turn coils in response to a voltage applied between the first and second electrodes to tune an inductance of the tunable inductor.

13. The tunable inductor of claim 12 wherein the substrate comprises a semiconductor substrate.

14. The tunable inductor of claim 12 wherein each elongate member comprises a compressively-stressed layer, and a tensile-stressed layer to provide the in-plane stress gradient.

15. The tunable inductor of claim 14 wherein the compressively-stressed layer comprises silicon dioxide, and the tensile-stressed layer comprises silicon nitride.

16. The tunable inductor of claim 14 wherein the compressively-stressed layer comprises silicon dioxide, and the tensile-stressed layer comprises tungsten.

17. The tunable inductor of claim 12 wherein each elongate member has a tapered or stepped shape.

18. The tunable inductor of claim 12 wherein each elongate member has a plurality of etch-release holes therein which vary in density with distance towards the unanchored end.

19. The tunable inductor of claim 12 wherein the first electrode is formed from the substrate.

20. The tunable inductor of claim 12 wherein the first electrode comprises polycrystalline silicon or metal.

21. The tunable inductor of claim 12 wherein the second electrode comprises a metal selected from the group consisting of aluminum, copper and tungsten.

22. The tunable inductor of claim 12 wherein the first electrode has a tapered or stepped shape.

23. The tunable inductor of claim 12 wherein the first electrode has a zigzag shape.

24. The tunable inductor of claim 12 wherein the first electrode comprises a segmented electrode further comprising a plurality electrodes which are addressable independently or in sets to digitally vary the inductance of the tunable inductor.

* * * * *